July 29, 1924.
O. C. SCHMIDT
SCRAPING MEANS FOR CARCASS DEHAIRING MACHINES
Filed May 14, 1923
1,502,749
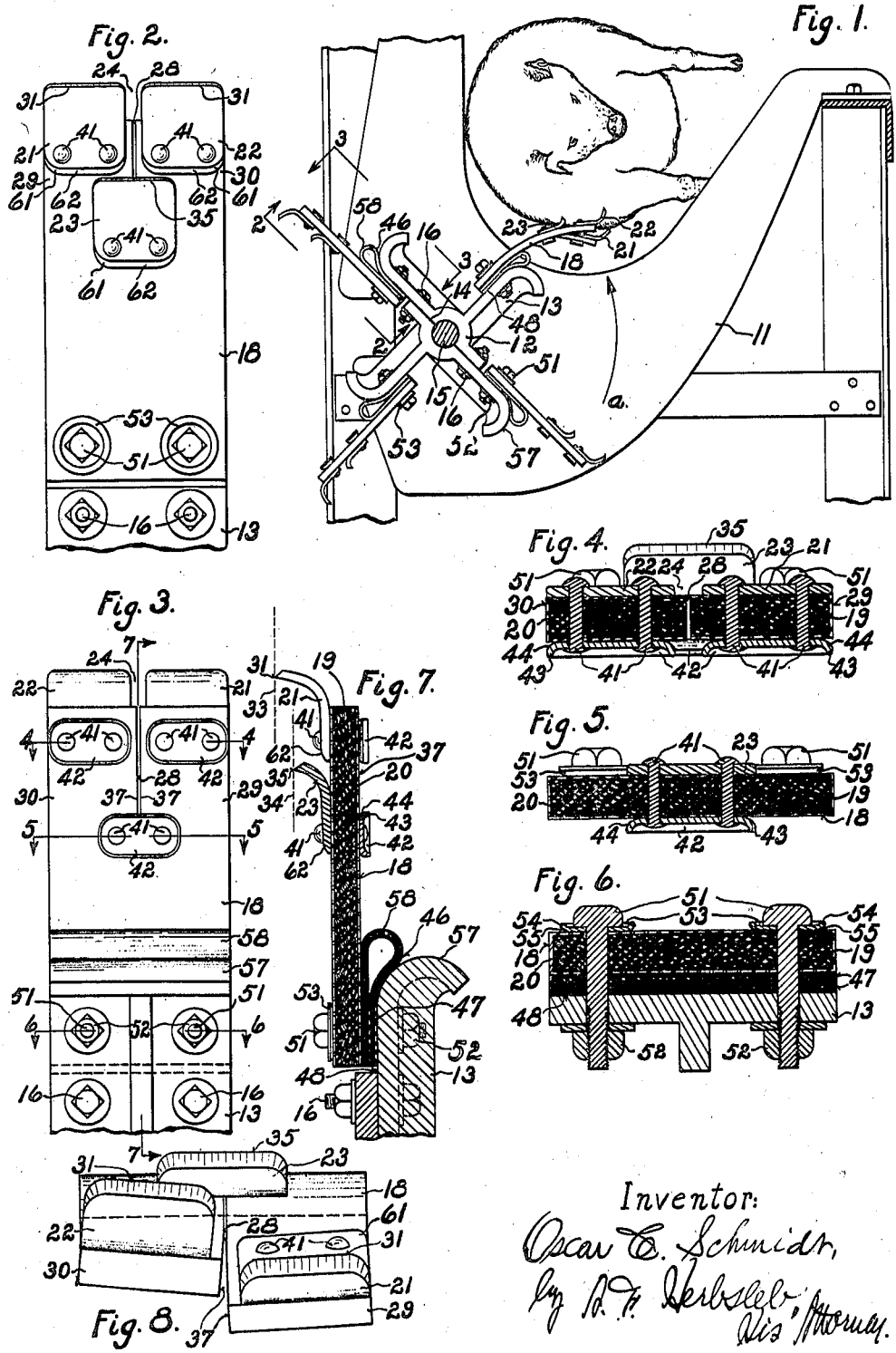

Patented July 29, 1924.

1,502,749

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

SCRAPING MEANS FOR CARCASS-DEHAIRING MACHINES.

Application filed May 14, 1923. Serial No. 638,729.

*To all whom it may concern:*

Be it known that I, OSCAR C. SCHMIDT, a citizen of the United States, residing at Cincinnati, in the county of Hamilton, and State of Ohio, have invented certain new and useful Improvements in Scraping Means for Carcass-Dehairing Machines, of which the following is a specification.

My invention relates to means for mounting the scraper-blades of carcass dehairing machines, for dehairing or cleaning or polishing the carcasses, for instance, of hogs, and has for its object the provision of novel means whereby extreme flexibility in the mounting for the scraper-blades is obtained.

It is the object of my invention, further, to provide novel means whereby the scraper-blades are so mounted that enhanced flexibility between adjacent scraper-blades is obtained; further, to provide novel means whereby scraper-blades are resiliently flexibly mounted with relation to their support; and, further, to provide novel fastening means coacting with a flexible arm whereby disintegration of the flexible arm is checked.

The invention will be further readily understood from the following description and claims, and from the drawings, in which latter:

Fig. 1 is a side elevation of my improved device, showing the same in connection with the carcass of a hog, to illustrate variant relations of the scraper-blades while acting on the carcass.

Fig. 2 is a cross-section of the same, partly broken away, taken on the line 2—2 of Fig. 1, and showing a scraper-arm in front elevation.

Fig. 3 is a cross-section of the same, taken on the line 3—3 of Fig. 1, partly broken away, and showing a rear elevation of a scraper-arm and its connections.

Fig. 4 is a cross-section, taken on the line 4—4 of Fig. 3.

Fig. 5 is a cross-section, taken on the line 5—5 of Fig. 3.

Fig. 6 is a cross-section, taken on the line 6—6 of Fig. 3.

Fig. 7 is a longitudinal section, taken on the line 7—7 of Fig. 3.

Fig. 8 is an end view of the flexible resilient arm showing the supplemental sections thereof yielded to different extents and with relation to the body of said arm and also yielded torsionally.

I have exemplified my improved device in connection with a so-called grate or bar support, one of the bars of which is shown at 11, similar for instance, to the bars shown and described in Letters Patent No. 1,388,899, granted August 30, 1921, on my application for patent on improvements in carcass dehairing and cleaning machines, although it will be readily understood that my improved device is employable in other relations.

In my improved device I provide a central support of suitable character, exemplified as a hub 12 comprising arms 13 of suitable number, which are preferably rigid. The hub may be a divided hub, the respective sections of which are arranged to be clamped to a rotated scraper-shaft 15, as by means of suitable bolts 16 connecting the sections of the hub.

Flexible scraper-arms 18 are provided, which are preferably composed of resiliently yieldable material which may, for instance, be rubber belting, comprising suitable layers 19 of webbing or fabric, bound together by and coated with resilient rubber composition 20.

The flexible arm is arranged to resiliently yield when the scraper-blades contact with the carcass, the arms reassuming their normal positions, instanced as radial positions, while out of contact with the carcass. The resiliently flexible arms are preferably of substantially greater width than thickness, and are preferably of comparatively short length with relation to their reaching properties, the same being shown formed as extensions of the rigid arms 13.

The outer ends of the respective arms are provided with scraper-blades, three of which, 21, 22 and 23, are shown attached to said respective outer ends. The scraper-blades 21 and 22 are shown as outer scraper-blades, which are laterally separated, as shown by the space 24, between them, the inner scraper-blade 23 being received crosswise of the inner end of said space.

The resiliently flexible scraper arm is provided with a slit 28, which extends through the thickness of the outer or swinging end of the resiliently flexible arm, for forming the outer end of said arm as resiliently flexible supplemental arms 29, 30. The slit may be made by means of a saw. It is located in the space 24 between the scraper-blades 21, 22, and preferably extends lengthwise of the resiliently flexible arm 18 into proximity with the scraper-blade 23. The scraper-blade 23 is located at the base of said slit.

The resiliently flexible supplemental arms are yieldable independently of each other and of the body of the resiliently flexible arm 18 and are also permitted to yield torsionally with relation to each other and with relation to the main body of the resiliently flexible arm 18, as indicated in Fig. 8.

The scraping edges 31 of the outer scraper-blades 21, 22, are normally located in planes parallel with the scraper arm, indicated by the dotted line 33, in advance of the plane parallel with the scraper arm, indicated by the dotted line 34, in which the scraping edge 35 of the inner scraper-blade 23 is located.

The scraping edge of the inner scraper-blade 23 is therefore normally in rear of the scraping edges of the outer scraper-blades 21, 22, in their respective paths of travel, which has the effect that, when the resiliently flexible arm is bent by contact of the inner scraper-blade with the carcass, such bending will not be to the extent of moving the outer scraper-blades rearwardly out of contact with the carcass, but only to such extent as to still leave said outer scraper-blades in contact with the carcass, in order that all of the scraper-blades will simultaneously act on the carcass to scrape the same.

The scraping edges of the respective scraper-blades are arranged to relatively and independently follow the contours of the surface of the carcass for attacking all parts of said surface, and thereby remove the hair therefrom and clean the same. The scraper-blades are thereby further enabled to reach into the cavities, creases and recessed portions of said surface, and to independently yield to the elevated portions of said surface, for following the rises and recessions of the surface which is being acted on by the various scraper-blades, so as to scrape and clean the shoulders, the hams and reach under the legs and follow the ears and contours of the head, body and legs and other parts of the carcass being scraped.

Various relations which the scraper-blades may assume are indicated in Figs. 1 and 8. The resilient flexible supplemental arms yield and flex with relation to each other and with relation to the body of the resiliently flexible arm, and the resiliently flexible arm yields with relation to its support. The yielding properties of the resiliently flexible arm are preferably less than the yielding properties of the resiliently yieldable supplemental arms.

The slit 28 between the supplemental arms is preferably narrow, but still of sufficient width to separate the walls 37 of said slit to permit substantial free movement of said supplemental arms relative to each other, and the supplemental arms are preferably integral with the body of the arm, the fabric and rubber composition of the arm, when composed of a material similar to rubber belting, preferably continuing integrally between the body of the arm and the supplemental arms (see Fig. 7).

The scraper-blades are preferably secured to the flexible arm and the supplemental flexible arms by means of tension fastening means, shown as rivets 41, which pass through the scraper-blades, the body of the flexible material, and washers 42, the rivets being upset or headed at the outer faces of the scraper-blades and washers. The washers are preferably cup-shaped, with the bases thereof presented toward the flexible material, and have out-turned margins 43, for forming rounded edges 44 between the margins of the washers and the flexible material. These washers are preferably elongated, so that the cup-portion of each of the washers receives the ends of all of the rivets connecting any given scraper-blade with the flexible material, the washers extending crosswise of the scraper-blades.

This construction has been found to be very useful in preventing disintegration of the flexible material and injury to the surface of the flexible material. It extends the life of the scraper-arm, and securely fastens the scraper-blade to the flexible material.

I prefer to provide a cushion 46 between the inner end of the flexible scraper-arm and its support. This cushion preferably comprises a loop of flexible material, similar to the flexible material of which the flexible scraper-arm is composed, the same, however, being of less thickness. The ends 47 of the loop are received under the inner end of the flexible arm, between the flexible arm and the face 48 of the support to which the flexible arm is secured.

Bolts 51 and nuts 52 threaded thereon are arranged to clamp the inner end of the flexible arm and the cushion to the rigid arm. Washers 53, which are cup-shaped and have out-turned margins 54, are located between the heads of the bolts and the flexible arm, the washers having outwardly rounded edges 55 between the flexible material and the margins of the washers, the bases of the cup-shaped washers being presented toward the flexible material. This construction and arrangement avoids disintegration of the flexible material and prevents injury to the flexible material about the margins of the washers, and enhances the life of the flexible arms.

The outer ends of the rigid arms are provided with curved faces 57, between which and the flexible arms the loop portions 58 of the cushions are located.

The inner corners of the scraper-blades are preferably rounded, as shown at 61, and the outer surfaces of these rounded corners, and the rear ends of the scraper-blades are preferably tapered toward the flexible material, as shown at 62, in order to prevent cutting, scratching or injury to the skin of the carcass.

The scraper structure has rotation imparted thereto in the direction of the arrow *a*, for operating on the carcass in the carcass-support. Contact of the scraper-blades with the carcass causes the scraper-blades to flex rearwardly, the outer scraper-blades being cushioningly mounted with relation to the body of the flexible scraper arm, by being secured to the supplemental flexible arms, so as to independently yield according to the contours of the carcass being cleaned, for instance, as indicated in Figs. 1 and 8, and with relation to the inner scraper-blade, the scraper-blades further yielding with relation to their support by the yielding of the body of the flexible arm, and being additionally cushioned by the loop-cushion at the inner end of the flexible arm.

My improved device is arranged especially for following the contours of the carcass, and reaching into the cracks and crevices of the same, and provides a simple, efficient and very durable means for effecting the cleaning of the carcass, and by its construction and arrangement and the construction and arrangement of the fastening means between the scraper-blades and the flexible arm, and between the flexible arm and its support, provides extreme durability for the flexible arm and its supplemental arms, it being understood that scraping devices of this character are, during operation, continuously subjected to the action of moisture, greases and scurf of the carcass being cleaned, which has been just previously scalded, and may also be subjected to a spray of tempered water during the cleaning operation.

Having thus fully described my invention what I claim as new, and desire to secure by Letters Patent, is:

1. A carcass scraper comprising a support, a resilient arm thereon provided with a slit at its outer end to form a plurality of supplemental arms side by side at said outer end, scraper-blades on said respective supplemental arms, and a scraper-blade at the base of said slit.

2. A carcass scraper comprising a resiliently flexible arm, a plurality of resiliently flexible supplemental arms at its outer end having greater flexibility than said resiliently flexible arm, and scraper-blades having rear rounded corners, said scraper-blades mounted independently resiliently yieldable with relation to said resiliently flexible arm by being secured to said resiliently flexible supplemental arms.

3. A carcass scraper comprising a flexible arm, a plurality of flexible supplemental arms at its outer end having greater flexibility than said flexible arm, outer scraper-blades secured to said respective flexible supplemental arms having forwardly extending scraping edges, and an inner scraper-blade secured to said flexible arm, said last-named scraper-blade having a scraping edge normally in rear of said first-named scraping edges.

4. A carcass scraper comprising a flexible arm, a plurality of flexible supplemental arms at its outer end, a rotatable support, a cushion between the rear face of said flexible arm and said support, and scraper-blades on said flexible supplemental arms, and constructed and arranged for cushioning said scraper-blades primarily by means of said flexible supplemental arms on said flexible arm and supplementally by said cushion between said flexible arm and said support.

5. A carcass scraper comprising a support, a resiliently flexible arm slit at its outer end to form a plurality of resiliently flexible supplemental arms, scraper-blades, and a cushion, said scraper-blades cushioningly mounted by being secured to said supplemental arms to permit yielding and resiling between said scraper-blades and said resiliently flexible arm and the inner end of said resiliently flexible arm backed by said cushion to permit supplemental yielding and resiling between said scraper-blades and said support.

6. A carcass scraper comprising an arm of substantially greater width than thickness and of resilient material, the outer end of said arm being slit lengthwise of said arm across its thickness to form supplemental arms at the respective sides of said slit, and scraper-blades fixed respectively to said arm at the base of said slit and to said supplemental arms, the scraping edges of said last-named scraper-blades located in planes parallel with said arm in advance of the plane parallel with said arm in which the scraping edge of said first-named scraper-blade is located.

7. A carcass scraper comprising an arm of substantially greater width than thickness and of resilient material, the outer end of said arm slit lengthwise of said arm across its thickness to form supplemental arms at the respective sides of said slit, a scraper-blade fixed to said arm at the base of said slit, and a scraper-blade fixed to each of said supplemental arms, said supplemental arms independently yieldable with relation to each other and to said arm, and constructed and arranged whereby said arm and said supplemental arms yield to different extents by contacts of said respective scraper-blades with the carcass being scraped, and the inner ends of said scraper-blades tapering in thickness toward said resilient material.

8. A carcass scraper comprising an arm of substantially greater width than thickness and of resilient material, the outer end of said arm slit lengthwise of said arm across its thickness to form supplemental arms at the respective sides of said slit, a scraper-blade fixed to said arm at the base of said slit, and a scraper-blade fixed to each of said supplemental arms, said supplemental arms independently yieldable with relation to each other and to said arm, and constructed and arranged whereby said arm and said supplemental arms yield to different extents by contacts of said respective scraper-blades with the carcass being scraped, the inner corners of said scraper-blades rounded, and the inner ends and said corners of said scraper-blades tapering in thickness toward said resilient material.

In testimony whereof, I have hereunto signed my name in the presence of two subscribing witnesses.

OSCAR C. SCHMIDT.

In presence of:—
 PERRY GLENN,
 DELMA WERNSING.